United States Patent
Heinzle et al.

(10) Patent No.: US 9,363,427 B2
(45) Date of Patent: Jun. 7, 2016

(54) DEVICE AND METHOD FOR CALIBRATING A TEMPORAL CONTRAST SENSOR WITH A FRAME-BASED CAMERA SENSOR

(71) Applicant: Disney Enterprises, Inc., Burbank, CA (US)

(72) Inventors: Simon Heinzle, Burbank, CA (US); Aljoscha Smolic, Burbank, CA (US); Oliver Wang, Burbank, CA (US); Alexander Sorkine Hornung, Burbank, CA (US); Yael Pritch, Burbank, CA (US); Henning Zimmer, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 275 days.

(21) Appl. No.: 14/012,552

(22) Filed: Aug. 28, 2013

(65) Prior Publication Data

US 2015/0062351 A1 Mar. 5, 2015

(51) Int. Cl.
*H04N 5/225* (2006.01)

(52) U.S. Cl.
CPC .................................. *H04N 5/2258* (2013.01)

(58) Field of Classification Search
None
See application file for complete search history.

(56) References Cited

U.S. PATENT DOCUMENTS

2014/0368712 A1* 12/2014 Park et al. ..................... 348/308

* cited by examiner

*Primary Examiner* — Justin P Misleh
(74) *Attorney, Agent, or Firm* — Fay Kaplun & Marcin, LLP

(57) ABSTRACT

A device and method incorporates features of a temporal contrast sensor with a camera sensor in an imager. The method includes registering the camera sensor with the temporal contrast sensor as a function of a calibration target. The method includes receiving camera sensor data from the camera sensor and temporal contrast sensor data from the temporal contrast sensor. The method includes generating a plurality of images as a function of incorporating the temporal contrast sensor data with the camera sensor data.

18 Claims, 3 Drawing Sheets

Graph
300

DEVICE AND METHOD FOR CALIBRATING A TEMPORAL CONTRAST SENSOR WITH A FRAME-BASED CAMERA SENSOR

BACKGROUND INFORMATION

Computer vision is conventionally employed to extract meaningful information from video data such as optical flow, tracking, face recognition, object recognition, etc. The video data is acquired using regular frame-based camera sensors where one image is integrated over an exposure period and then read out completely. However, this principle includes various shortcomings. For example, depending on the lighting conditions, long exposure times need to be used to avoid noisy images but lead to motion blur artifacts which often complicate or even make computer vision impossible. In another example, the frame-based readout leads to substantial latency from image acquisition until the image can be processed. This leads to problems in applications where systems require relatively fast reactions on events in images (e.g., robotics).

Another sensor used to acquire video data is a silicon retina (SR) sensor developed by the Institute for Neuroinformatics of the University of Zurich. The SR sensor utilizes a fundamentally different principle from traditional cameras. Specifically, the SR sensor is event-based, asynchronous, and registers relative changes in intensity rather than attempting to determine absolute brightness values. Thus, instead of returning a color value per pixel (as is the case with traditional cameras), a measurement of the SR sensor represents a signal spike whenever a change in light intensity is detected that exceeds a predetermined threshold. These spikes are forwarded to the SR's output asynchronously and with a precise timestamp and the signaling pixel's coordinate. Rather than reading pictures, a client of the SR sensor receives a stream of events indicating at what point in time a certain pixel experiences a significant rise or fall in light intensity. The transmission of local changes is substantially similar to the way biological retinas transmit visual signals to the brain.

The client of the SR sensor is not required to wait for a full frame to be exposed to realize important changes in the scene. Since only changes are registered, the client is also not required to spend processing power on separating and discarding redundant information about parts of the scene's image that remain static. Due to the very low latency with changes that are registered, it is possible for the client to react even more quickly. While high-speed video cameras can reach recording frame rates of 2,000 full frames per second and beyond at considerable bandwidth costs and high requirements for lighting, an SR sensor can register tens of thousands of events per pixel and second even at very low light. However, the SR sensor generates computational data only. That is, the data registered by the SR sensor does not have practical use to a human observer since the SR sensor does not yield a pictorial representation of the world. The SR sensor has mostly been used directly in computer vision contexts.

Accordingly, there is a need for incorporating the features of the SR sensor with a regular frame-based camera sensor.

DETAILED DESCRIPTION

Figure 1:
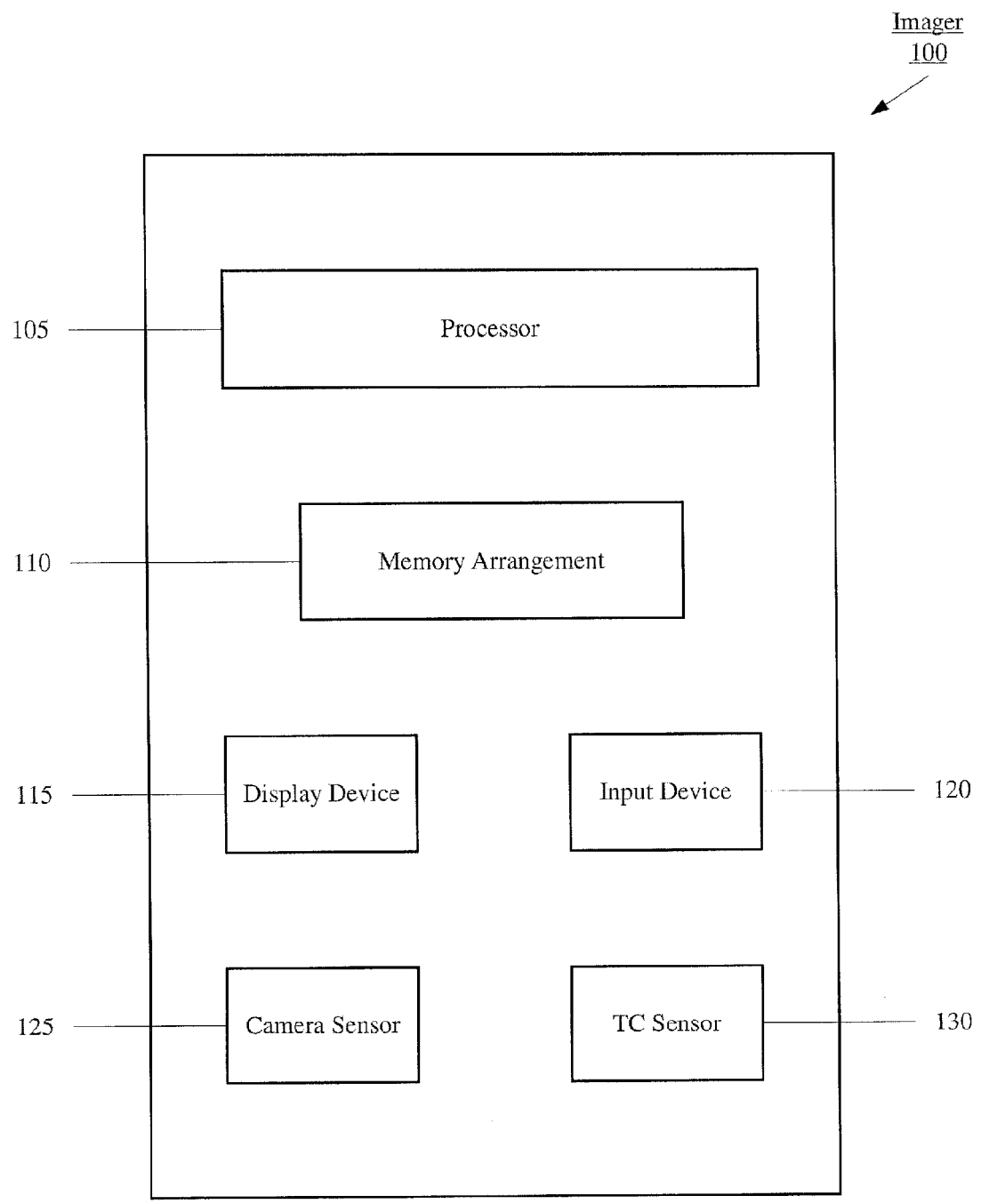
FIG. 1 shows an imager including a camera sensor and a temporal contrast (TO) sensor according to the exemplary embodiments.

The present invention relates to a device and method comprising registering, by a processor of an imager including a camera sensor and a temporal contrast sensor, the camera sensor with the temporal contrast sensor as a function of a calibration target; receiving, by the processor, camera sensor data from the camera sensor and temporal contrast sensor data from the temporal contrast sensor; and generating, by the processor, a plurality of images as a function of incorporating the temporal contrast sensor data with the camera sensor data.

The exemplary embodiments may be further understood with reference to the following description of the exemplary embodiments and the related appended drawings, wherein like elements are provided with the same reference numerals. The exemplary embodiments are related to a device and method for incorporating a temporal contrast sensor with a regular color, full frame camera. Specifically, the device utilizes data generated by the full frame camera to capture high quality color information at discrete instances of time and data generated by the temporal contrast sensor to provide temporal in-between information of intensity changes. The full frame camera, the temporal contrast sensor, the respective data thereof, and a related method for incorporating the temporal contrast sensor will be explained in further detail below.

It should be noted that the description herein utilizes the term "camera sensor." The camera sensor relates to any regular color, full frame camera. Accordingly, the camera sensor used herein is for the above described regular frame-based camera sensor as is known conventionally. It should also be noted that a temporal contrast sensor relates to a sensor that registers changes in contrast asynchronously over time. For example, the temporal contrast sensor may be a silicon retina sensor.

FIG. 1 shows an imager 100 including a camera sensor 125 and a temporal contrast (TC) sensor 130 according to the exemplary embodiments. The imager 100 may be any device configured to capture a plurality of images. For example, the imager 100 may capture a stream of images. Specifically, the imager 100 may generate the plurality of images as a function of data generated from the camera sensor 125 and the TC sensor 130 (as will be discussed in further detail below). In another example, the imager 100 may capture a video stream which consists of a plurality of consecutive images. The images of the video stream may also be generated as a function of data generated from the camera sensor 125 and the TC sensor 130. Accordingly, the imager 100 may generate pictorial images for a user to view. The imager 100 may include a processor 105, a memory arrangement 110, a display device 115, an input device 120, the camera sensor 125, and the TC sensor 130.

The display device 115 may be any conventional component configured to show the images generated by the imager 100. However, the display device 115 may further be configured to incorporate the features described below of the in-between information of intensity changes for the images that are generated using the data of the TC sensor 130. The input device 120 may be any conventional component configured to receive a user input. For example, the input device 120 may be a push button that allows a user to activate the camera sensor 125 and the TC sensor 130 to begin capturing images. It should be noted that the input device 120 may be incorporated in the display device 115 such that the display device 115 is a touch screen.

The camera sensor 125 may be any conventional regular frame-based camera sensor configured to capture images and generate respective camera sensor data. As will be discussed below, the camera sensor data that is generated by the camera sensor 125 may be used as a first component to generate the images shown on the display device 115. The TC sensor 130 may be any conventional TC sensor configured to generate respective TC sensor data. For example, the TC sensor 130 may be a DVS128 developed at the Institute of Neuroinformatics at the University of Zurich having an array with a spatial dimension of 128×128 pixels, detecting changes in intensity at lighting levels ranging from direct sunlight to as low as 2 lux or even lower for high-contrast changes such that a latency of 15 micro seconds results in a theoretical upper limit of over 65,000 events a second per pixel. In a substantially similar manner, the TC sensor data that is generated by the TC sensor 130 may be used as a second component to generate the images shown on the display device 115.

The memory arrangement 110 may be any conventional component configured to store data. Specifically, the memory arrangement 110 is configured to store the camera sensor data generated by the camera sensor 125 and the TC sensor data generated by the TC sensor 130.

According to the exemplary embodiments, the processor 105 may be any processing component that incorporates the TC sensor data with the camera sensor data to generate the images shown on the display device 115. The processor 105 is configured to register the TC sensor 130 with the camera sensor 125 so that information from these sensors may be correlated. Specifically, the processor 105 registers the two sensors via regular camera calibration and custom calibration targets, as will be described below. The processor 105 is further configured to translate spatial information for tracking as a function of the asynchronous binary data from the TC sensor 130. Specifically, the processor 105 computes motion vectors directly from the TC sensor data and utilizes this as priors in an optical flow algorithm or by directly including the TC point clouds into optical flow, image deblurring, or framerate upsampling algorithms, as will be described below. It is noted that the term "prior" relates to the use in a mathematical sense; generally, prior knowledge is used in the art to constrain the problem solution space thereby improving algorithms' accuracy and efficiency. That is, the term "prior" is information obtained from the TC sensor data used as prior knowledge when computing the optical flow. According to the exemplary embodiments, this prior knowledge already contains some indication of the optical flow that is used in the computation.

An initial process to incorporate the TC sensor data with the camera sensor data is to register the camera sensor 125 and the TC sensor 130. As discussed above, this registering may be performed with regular known in the art camera calibration methods and may include custom calibration targets. For example, a regular calibration target that may be used to calibrate the camera sensor 125 such as a fixed checkerboard. The regular camera calibration for the camera sensor 125 may also relate to further conventional calibrating techniques. However, while the mathematical principles behind camera calibration for the camera sensor 125 are known, the nature of utilizing the TC sensor 130 requires novel calibration targets. Specifically, the fixed checkerboard is invisible to the TC sensor 130. That is, the fixed checkerboard would result in no changes in intensity for every pixel, thereby not allowing for the calibration of the TC sensor.

According to the exemplary embodiments, the calibration of the TC sensor 130 with the camera sensor 125 may be performed in at least one of three approaches. In a first approach, the regular calibration target such as the fixed checkerboard may be moved at a constant speed. Thus, with regard to the TC sensor 130, observable events may be recognized by the TC sensor 130 as the changes in intensity are recorded. However, this may lead to motion blur in the camera sensor 125, thereby possibly corrupting the calibration. This may be rectified using motion vectors, as will be discussed below. In a second approach, the regular calibration target may be used in conjunction with varying light conditions (e.g., camera flash, blinking illumination, etc.). Accordingly, the changes in intensity may be recorded with the TC sensor 130. In a third approach, a temporally changing calibration target that results in many events in the TC sensor 130 but in a static image in the camera sensor 125 may be utilized. For example, the temporally changing calibration target may be fast blinking light emitting diodes, a liquid crystal display monitor displaying a flashing pattern, etc. Through any one or combination of the above approaches, the processor 105 may register the TC sensor 130 with the camera sensor 125.

Figure 3:
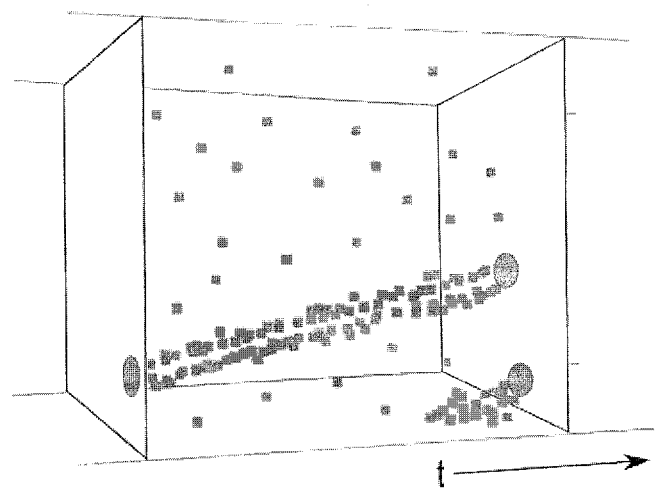
FIG. 3 shows a graph of intensity changes using the TC sensor according to the exemplary embodiments.

A further process to incorporate the TC sensor data with the camera sensor data is to translate the asynchronous binary data of the TC sensor 130 into spatial information for tracking. According to the exemplary embodiments, motion vectors may be calculated and used. The TC sensor data of the TC sensor 130 may include binary events in time. For example, at time T, a pixel at coordinates (x, y) has changed its intensity in the +/− direction. The event may also record the magnitude of the change in intensity. The processor 105 may receive this TC sensor data in order to recover motion vectors. For example, the processor 105 may determine where one pixel moves over time. The processor 105 may determine the motion vectors through line fittings, fitted curves (for non-linear motion), or fitted surfaces (for space-time volume). For example, FIG. 3 shows a graph 300 of intensity changes using the TC sensor 130 according to the exemplary embodiments. As shown, the graph 300 may be a three-dimensional representation for the pixels that have a change in intensity over time. Using this data, the motion vectors may be determined by the processor 105.

As discussed above, the TC sensor data may include point clouds that may be directly included in the computation of the motion vectors. Specifically, a variational optical flow estimation may be performed. According to the exemplary embodiments, for each pixel in a first RGB frame, a plane may be fitted to the TC events corresponding to the RGB frame's exposure. If a fitting is successful, a confidence value may be calculated for the fit and intersect the plane with a second RGB frame. The resulting line in the second RGB frame provides where the pixel in the first frame has moved according to the TC sensor data. The optical flow between the two RGB frames may then be calculated using the estimated lines as a prior. An extra prior term may be added to the classic energy formulation that encourages the flow vectors to lie on the estimated lines. This term is weighted by a user-specified tuning parameter as well as with the computed confidence values. In this manner, the TC sensor data may be incorporated in the camera sensor data to generate the images.

Also as discussed above, the calibration of the TC sensor 130 using a moving calibration target may result in blurring. The processor 105 may utilize a deblurring algorithm to compensate for this calibration. According to the exemplary embodiments, the processor 105 may determine an approximate shape of a blur kernel by integrating TC events within an exposure time of a RGB frame. The approximated blur kernel may be used as a prior in a blind deconvolution algorithm to compensate for the blur. That is, a distance is minimized between the RGB frame and the prior in each step of the deblurring algorithm. In this manner, the TC sensor 130 may be registered with the camera sensor 125 more accurately.

As discussed above, the TC sensor data or data generated from TC related functionalities may be used to improve an optical flow. That is, the TC sensor data may be incorporated with the camera sensor data. However, the processor 105 may further be configured to generate object tracking data explicitly from the TC sensor data. Subsequently, the calibrated setup of the camera sensor 125 and the TC sensor 130 may be used to place the tracking result of the object tracking data that is generated only from the TC sensor data in the context of the color image or video of the camera sensor 125. The following provides a manner of tracking TC sensor data such that a more complicated tracking operation is performed that uses the TC sensor data in a full (non-quantized) [x, y, timestamp] space in which multiple objects and occlusions may be handled and is robust to noise.

According to the exemplary embodiments, an object may be represented as a single point and an associated cloud of TC events may be around the point. Therefore, with multiple objects, each object is represented as a respective single point having a respective cloud. Using any of the known manners discussed above or through a manual input, start points and start times of the objects may be provided. As TC sensor data relates to a change in contrast or the registration of this event, the objects may be tracked over a number of event windows in which each event window is composed of a given number of events (which is in contrast to standard video-images captured by the camera sensor 125 which integrates light intensity in a given amount of time). The use of the number of events as measured through the TC sensor data allows for an improved tracking of the objects. For example, in a time duration where an object is occluded by another static object or temporarily stop moving, events may not be recorded by the TC sensor 130 due to lack of observed motion (i.e., changes in light intensity). In this case, an event window may contain events recorded before and after this time duration and tracking may be carried out consistently. For example, when a ball is bouncing, breaks in the measured event stream may occur at the apogee of each bounce and each time the ball contacts a surface. The tracking of the ball then may be performed seamlessly in spite of the fragmented event stream. In another example in which an occlusion occurs (e.g., a stop), the tracking of the exemplary embodiments may skip over the occlusion as no events occur and the tracking of the object may continue on the other side of the occlusion (e.g., when an object continues moving). Accordingly, the tracking may be performed such that these moments of the bounce are omitted.

According to a specific exemplary embodiment in which a single object is tracked, again, a start point and a start time may be provided for this object. The processor 105 may compute a best fit line using a Random Sample Consensus (RANSAC) line fitting method for events in the starting frame. Again, a frame is composed of a given number of events. Subsequently, the start point may move by some fraction of a frame so that another best fit line may be computed for the events within the new shifted frame. It should be noted that overlapping frames may be used for robustness. This process may continue through the volume of the TC sensor data (i.e., recorded footage) that tracking data is to be generated therefrom. This results in a number of best fit lines and respective inlier events for each line fit. The processor 105 may consider whether to utilize all the lines or may selectively discard lines that are noisy. Once the lines to be used are selected, a spline may be fit to the inliers. The spline that is generated may represent an estimate of the location of the object over time. That is, the TC sensor data is used for the object to be tracked using events as a basis to ultimately be applied to the object over time for the images of the camera sensor 125.

According to a further specific exemplary embodiment in which multiple objects are tracked, a RANSAC results in a convergence to a largest object (having the most number of inliers). Therefore, the single object process described above may not provide the same results simply from utilizing multiple start points for each object to be tracked. When multiple objects are to be tracked, a best fit line for each object in the first frame may be computed by the processor 105. The processor 105 may then determine the object with the most inlier events and remove these points from the frame. The processor 105 may then compute the best fit lines for the remaining objects, once again, may determine the object with the most inliers and remove these points from the frame. This process may be repeated until a line fit for all the objects are generated. Accordingly, objects do not interfere with each other in the tracking stage and scenarios where objects overlap may be handled.

Using the above manner of tracking a single object or multiple objects using TC sensor data, motions may be tracked that would otherwise be incapable of being tracked. For example, a traditional tracking method (e.g., using a camera sensor) may be incapable of tracking objects when they are moving fast or significantly too fast. In fact, when this scenario is present, abject failure results using only the camera sensor 125 due to the fact that the object appearance is too motion blurred to track even a single frame. In this case, the frame relates to the camera sensor 125, thereby being a single image in time. However, the TC sensor data and tracking using events provides for tracking of objects even under conditions where tracking is not otherwise possible.

Figure 2:
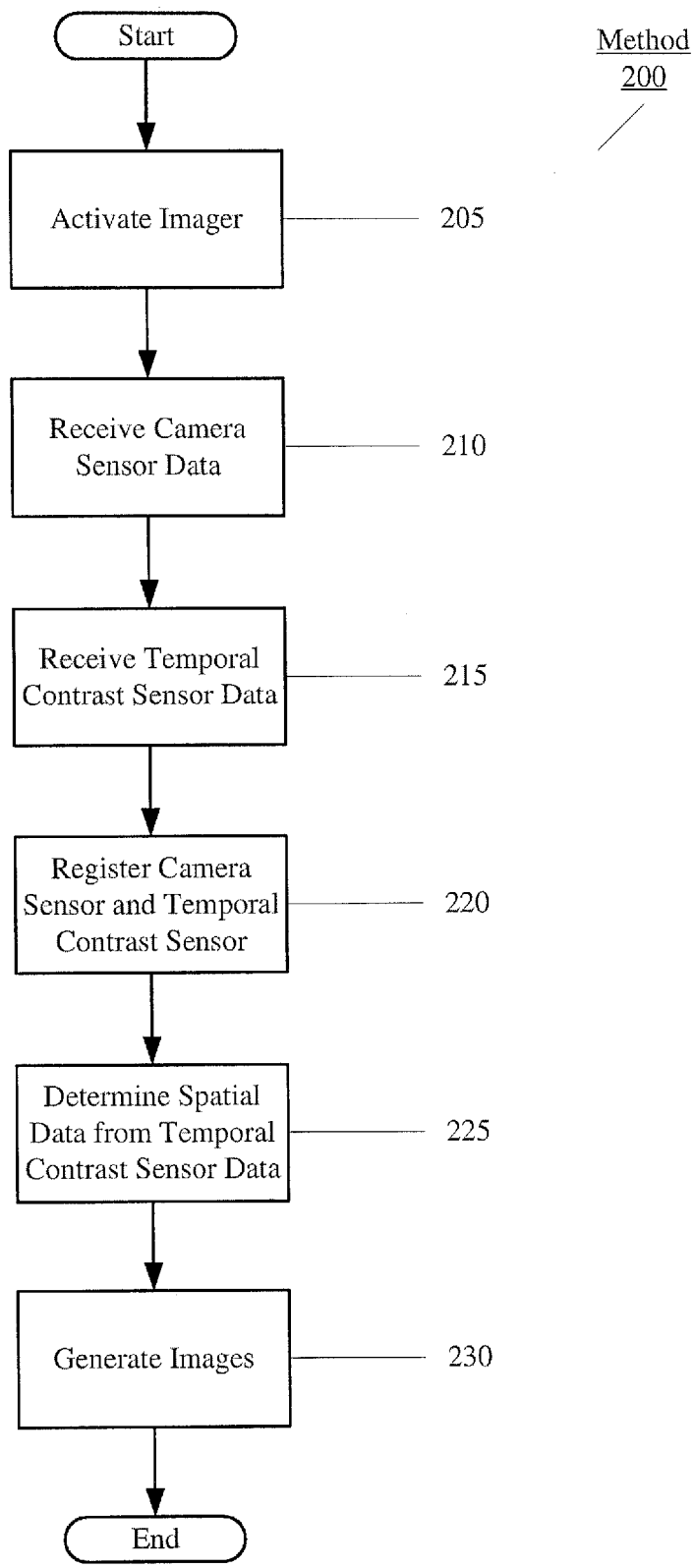
FIG. 2 shows a method for calibrating the temporal contrast sensor with the camera sensor according to the exemplary embodiments.

FIG. 2 shows a method 200 for calibrating the TC sensor 130 with the camera sensor 125 according to the exemplary embodiments. The method 200 relates to generating images from utilizing data generated from both the camera sensor 125 and the TC sensor 130. Accordingly, the processor 105 is configured to register these sensors with respect to one another such that the TC sensor data may be properly incorporated in the camera sensor data. The method 200 will be discussed with regard to the imager 100 of FIG. 1.

In step 205, the imager 100 is activated. As discussed above, the imager 100 may include an input device 120 that receives a user input to activate the camera sensor 125 and the TC sensor 130. However, it should be noted that the imager 100 is not required to be activated manually. For example, once activated, the imager 100 may run continuously with the camera sensor 125 and the TC sensor 130 activated.

In step 210, the processor 105 receives the camera sensor data from the camera sensor 125. As discussed above, the camera sensor 125 may generate the camera sensor data that relates to the functionalities thereof. Specifically, the camera sensor 125 generates full frame based data and color related data for the images. In step 215, the processor 105 receives the TC sensor data from the TC sensor 130. As discussed above, the TC sensor 130 may generate the TC sensor data that relates to the functionalities thereof. Specifically, the TC sensor 130 generates intensity changes for each pixel within a given frame over time.

In step 220, the processor 105 registers the camera sensor 125 with the TC sensor 130. As discussed above, these sensors require registering such that the data from the TC sensor 130 is properly associated with the camera sensor data. Thus, the processor 105 may utilize regular camera calibration targets and custom calibration targets. In a first way, the processor 105 may utilize a calibration target moving at a known speed. In a second way, the processor 105 may utilize a calibration target at varying light conditions. In a third way, the processor 105 may use a temporally changing calibration target.

In step 225, the processor 105 determines the spatial data from the TC sensor data. As discussed above, the processor 105 may utilize calculated motion vectors to determine the spatial data of the TC sensor data. Using the binary event over time, the motion vectors may be calculated, thereby allowing the processor 105 to incorporate the TC sensor data with the camera sensor data. In another exemplary embodiment, the processor 105 may utilize the TC sensor data for object tracking to later be placed in the tracking result in the camera sensor data using the calibrated setup.

In step 230, the processor 105 generates the images from the camera sensor data in which the TC sensor data is incorporated.

It should be noted that the steps of the method 200 is only exemplary. In a first example, the registering and determining of steps 220 and 225 may be performed at different times. Specifically, after step 205, the imager 100 may be configured to register the sensors. The imager 100 may also be configured to determine the spatial data at any time after receiving the TC sensor data. In a second example, the method 200 may include additional steps. For example, the processor 105 may perform a variational optical flow estimation for the motion vectors. In another example, the processor 105 may perform a deblurring algorithm for the registering of the sensors.

The exemplary embodiments provide a device and method for incorporating temporal contrast sensor data into camera sensor data. Specifically, pictorial images generated by a camera sensor may incorporate the changes in intensity for pixels determined by a temporal contrast sensor. An imager including both of these sensors may also include a processor that is configured to register the sensors with regard to each other such that the temporal contrast sensor data is properly associated with the camera sensor data. The spatial orientation of the temporal contrast sensor data may also be calculated by the processor to further coordinate how the temporal contrast sensor data is to be incorporated in the camera sensor data. In this manner, the images generated by the imager 100 may take advantage of both the features of the camera sensor and the temporal contrast sensor.

By combining the features of the TC camera with a regular color frame-based camera, high quality color information captured at discrete instances of time and temporal in-between information of intensity changes are realized in an imager that produces pictorial representations. This allows for applications such as high-quality optical flow for fast moving objects, intra-frame object and pixel tracking, and more advanced robotics methods that require short latency.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the registering of the sensors may be embodied as a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
  registering, by a processor, a camera sensor of an imager and a temporal contrast sensor of the imager, the camera sensor registered with the temporal contrast sensor as a function of a calibration target,
    wherein the calibration target is at least one of a fixed pattern that is moved at a predetermined speed, a predetermined target measured at varying light conditions, and a temporally changing calibration target;
  receiving, by the processor, camera sensor data from the camera sensor and temporal contrast sensor data from the temporal contrast sensor; and
  generating, by the processor, a plurality of images as a function of incorporating the temporal contrast sensor data with the camera sensor data.

2. The method of claim 1, further comprising:
  determining spatial data of the temporal contrast sensor data, the spatial data being indicative of a position and an orientation in which the temporal contrast sensor data is to be incorporated with the camera sensor data.

3. The method of claim 2, wherein the temporal contrast sensor data includes a binary event over time, the binary event being indicative of an intensity change in a determined direction and associated with a time measurement and a pixel-coordinate measurement.

4. The method of claim 2, wherein the spatial data is determined as a function of a variational optical flow estimation.

5. The method of claim 2, wherein the spatial data is determined as a function of a deblurring in which a distance of an estimated blur kernel is minimized.

6. The method of claim 2, wherein the spatial data is determined as a function of motion vectors, the motion vectors being at least one of a line fitting in a time volume, a fitted curve for non-linear motion, and a fitted surface in a space-time volume.

7. The method of claim 1, wherein the fixed pattern is a checkerboard.

8. The method of claim 1, wherein the varying light conditions is one of a camera flash and a blinking illumination.

9. The method of claim 1, wherein the temporally changing calibration target is one of blinking light emitting diodes and a flashing pattern.

10. A device, comprising:
  a camera sensor configured to generate camera sensor data;
  a temporal contrast sensor configured to generate temporal contrast sensor data; and
  a processor configured to register the camera sensor with the temporal contrast sensor, as a function of a calibration target, wherein the calibration target is at least one of a fixed pattern that is moved at a predetermined speed, a predetermined target measured at varying light conditions, and a temporally changing calibration target, such that when the processor receives the camera sensor data and the temporal contrast sensor data, the processor generates a plurality of images as a function of incorporating the temporal contrast sensor data with the camera sensor data.

11. The device of claim 10, wherein the processor is configured to determine spatial data of the temporal contrast sensor data, the spatial data being indicative of a position and an orientation in which the temporal contrast sensor data is to be incorporated with the camera sensor data.

12. The device of claim 11, wherein the temporal contrast sensor data includes a binary event over time, the binary event being indicative of an intensity change in a determined direction and associated with a time measurement and a pixel-coordinate measurement.

13. The device of claim 11, wherein the spatial data is determined as a function of a variational optical flow estimation.

14. The device of claim 11, wherein the spatial data is determined as a function of a deblurring in which a distance of an estimated blur kernel is minimized.

15. The device of claim 10, wherein the fixed pattern is a checkerboard.

16. The device of claim 10, wherein the varying light conditions is one of a camera flash and a blinking illumination.

17. The device of claim 10, wherein the temporally changing calibration target is one of blinking light emitting diodes and a flashing pattern.

18. A non-transitory computer readable storage medium including a set of instructions executable by a processor, the set of instructions causing the processor to:
    register a camera sensor with a temporal contrast sensor, as a function of a calibration target,
        wherein the calibration target is at least one of a fixed pattern that is moved at a predetermined speed, a predetermined target measured at varying light conditions, and a temporally changing calibration target;
    receive camera sensor data from the camera sensor and temporal contrast sensor data from the temporal contrast sensor; and
    generate a plurality of images as a function of incorporating the temporal contrast sensor data with the camera sensor data.

\* \* \* \* \*